(12) United States Patent
Avraham

(10) Patent No.: US 11,325,782 B2
(45) Date of Patent: May 10, 2022

(54) HUMAN-ASSISTED ROBOTIC PICKING APPARATUS

(71) Applicant: GET FABRIC LTD, Tel Aviv (IL)

(72) Inventor: Ori Avraham, Kfar Saba (IL)

(73) Assignee: GET FABRIC LTD., Tel Aviv (IL)

( * ) Notice: Subject to any disclaimer, the term of this patent is extended or adjusted under 35 U.S.C. 154(b) by 297 days.

(21) Appl. No.: 16/485,317

(22) PCT Filed: Feb. 11, 2018

(86) PCT No.: PCT/IL2018/050156
§ 371 (c)(1),
(2) Date: Aug. 12, 2019

(87) PCT Pub. No.: WO2018/146687
PCT Pub. Date: Aug. 16, 2018

(65) Prior Publication Data
US 2019/0359424 A1    Nov. 28, 2019

Related U.S. Application Data

(60) Provisional application No. 62/457,911, filed on Feb. 12, 2017.

(51) Int. Cl.
*B65G 1/137* (2006.01)
*B25J 13/02* (2006.01)
(Continued)

(52) U.S. Cl.
CPC .......... *B65G 1/1378* (2013.01); *B25J 9/0084* (2013.01); *B25J 13/02* (2013.01); *G06Q 10/087* (2013.01); *G08C 17/02* (2013.01); *G08C 2201/51* (2013.01)

(58) Field of Classification Search
CPC ....... B65G 1/1378; B25J 9/0084; B25J 13/02; G06Q 10/087; G08C 17/02; G08C 2201/51
See application file for complete search history.

(56) References Cited

U.S. PATENT DOCUMENTS 9,008,840 B1    4/2015  Ponulak et al.
9,120,622 B1 *  9/2015  Elazary ................ B25J 15/0608
(Continued)

FOREIGN PATENT DOCUMENTS

WO    2016009423 A1    1/2016

OTHER PUBLICATIONS

PCT/ISR/210 Search Report dated Apr. 30, 2018 (pp. 3).

*Primary Examiner* — Michael Collins
(74) *Attorney, Agent, or Firm* — Tutunjian & Bitetto, P.C.

(57) ABSTRACT

A robotic picking apparatus, system and method of use thereof. A system comprising: a plurality of robotic picking apparatuses configured to pick an item from a container and place the item in a different place, wherein each robotic picking apparatus is configured to operate in one of at least three operational modes: an autonomous mode, a human-assisted mode, and a remote-controlled mode, wherein in the autonomous mode, the robotic picking apparatus operates without human input, wherein in the human-assisted mode, an operation plan is determined using human input and the operation plan is executed automatically without additional input from a human, wherein in the remote-controlled mode, movements of the robotic picking apparatus are controlled directly by a remote human user. Human users located at one or more remote sites provide the human input.

18 Claims, 5 Drawing Sheets

(51) Int. Cl.
  *G08C 17/02* (2006.01)
  *B25J 9/00* (2006.01)
  *G06Q 10/08* (2012.01)

(56) References Cited

U.S. PATENT DOCUMENTS

| | | | |
|---|---|---|---|
| 10,360,531 B1* | 7/2019 | Stallman | G06K 7/1413 |
| 10,538,421 B2* | 1/2020 | Blevins | B65G 1/1375 |
| 10,952,018 B2* | 3/2021 | Skaaksrud | G08B 21/18 |
| 2015/0360865 A1* | 12/2015 | Massey | B25J 9/0003 |
| | | | 414/275 |
| 2017/0183157 A9* | 6/2017 | Massey | B65G 1/1373 |
| 2019/0138978 A1* | 5/2019 | Johnson | G06Q 10/0835 |

* cited by examiner

HUMAN-ASSISTED ROBOTIC PICKING APPARATUS

CROSS-REFERENCE TO RELATED APPLICATION

This application claims the benefit of U.S. Provisional Application No. 62/457,911 filed Feb. 12, 2017, entitled "REMOTE OPERATION OF ROBOTIC PICKING STATIONS", which is hereby incorporated by reference in its entirety without giving rise to disavowment.

TECHNICAL FIELD

The present disclosure relates to robotic picking in general and to human-assisted robotic picking, in particular.

BACKGROUND

In a robotic warehouses, products are transferred to the packing station, also referred to as a picking station. In the picking station, items are moved from container, also referred to as "tote" or "crate", to container. For example, items may be moved from a box to a bag. The picking station may move items for different reasons or purposes, such as to assemble an order for a customer, to perform shelf replenishment, QA, clearance of date-expired items, or other warehouse processes, or the like.

In robotic warehouses, the picking stations may comprise of robotic picking apparatus used to pick items from one container and move them to another container. Various robotic picking apparatuses are known in the art, such as mimicking a human hand, an elephant's trunk, or the like. The robotic picking apparatus may be mounted on wheels or otherwise be mobile, thereby enabling the apparatus to move around and change its location, as well as to transport items that are carried thereby.

BRIEF SUMMARY

One exemplary embodiment of the disclosed subject matter is system comprising: a plurality of robotic picking apparatuses configured to pick an item from a container and place the item in a different place, wherein each robotic picking apparatus is configured to operate in one of at least three operational modes: an autonomous mode, a human-assisted mode, and a remote-controlled mode, wherein in the autonomous mode, the robotic picking apparatus is configured to automatically determine an operation plan in order to pick the item from the container and place the item in the different place and execute the operation plan without input from a human, wherein in the human-assisted mode, the operation plan is determined using input from a human and the operation plan is executed automatically without additional input from a human, wherein in the remote-controlled mode, movements of the robotic picking apparatus are controlled directly by a remote human user; wherein said plurality of robotic picking apparatuses are connectable over a network to a remote site, wherein in the remote site, human users are capable of providing input to said plurality of robotic picking apparatuses, wherein the input provided by the human users is transmitted to said plurality of robotic picking apparatuses over the network, wherein the input provided by the human users comprises input for the human-assisted mode and commands for remote controlling the robotic picking apparatus in the remote-controlled mode.

Optionally, a controller is configured to select an operation mode of an apparatus of said plurality of robotic picking apparatuses from the at least three operational modes, wherein said controller is configured to give preference to the autonomous mode over the human-assisted mode and the remote-controlled mode, wherein said controller is configured to give preference to the human-assisted mode over the remote-controlled mode.

Optionally, a controller is configured to: obtain sensor input from a plurality of sensors at a vicinity of a robotic picking apparatus of said plurality of robotic picking apparatuses; determine confidence measurement for the operation plan, wherein the operation plan is automatically determined using the sensor input; in case the confidence measurement is above a threshold, provide the operation plan for execution by the robotic picking apparatus in the autonomous mode; in case the confidence measurement is below the threshold, select one of human-assisted mode or remote-controlled mode for the robotic picking apparatus.

Optionally, said controller is configured to select human-assisted mode or remote-controlled mode based on a determination of whether human provided input can be used to determine the operation plan.

Optionally, said controller is configured to select between the autonomous mode, the human-assisted mode and the remote-controlled mode based on an estimated probability of success of operating in the autonomous mode, an estimated probability of success of operating in the human-assisted mode, and an estimated probability of success of operating in the remote-controlled mode.

Optionally, said controller is configured to select between the autonomous mode, the human-assisted mode and the remote-controlled mode based on an estimated cost of operating in the autonomous mode, an estimated cost of operating in the human-assisted mode, and an estimated cost of operating in the remote-controlled mode.

Optionally, said controller is configured to utilize human input to improve capabilities of the robotic picking apparatus in autonomous mode, whereby the autonomous mode is improved gradually based on human provided inputs of different types to allow picking of new items and items in new scenarios.

Optionally, the remote site comprises a first remote site comprising human-assistance stations and a second remote site comprising human telecontrol stations; wherein said human-assistance stations are equipped with controls for a human to provide additional input to be used to determine operation plans for said plurality of robotic picking apparatuses; wherein said human telecontrol stations are equipped with controls for a human to directly control movement of any of said plurality of robotic picking apparatuses.

Optionally, the remote site is configured to be manned by a number of human users for remotely assisting or controlling said plurality of robotic picking apparatuses, wherein a ratio between a total number of human users in said system and a total number of robotic picking apparatuses in said system is at least 1:10 or at least 1:100.

Optionally, in the human-assisted mode, the operation plan is determined using the input from a human that is used in the human-assisted mode, comprises at least one of: a user indication of the item in the container, whereby assisting a computer vision algorithm to identify the item; a user selection of the item between a plurality of items, whereby assisting a selection algorithm to select the item to be picked; a user indication of a softness level of the item, whereby assisting in determining amount of force to apply on the item during picking thereof; and a user indication of a location to put the item, whereby assisting a placement algorithm to determine where to place the item.

Optionally, the container is a bulk container comprising a plurality of items of a same type, wherein the different place is a shipping container comprising items based on an order, whereby said plurality of robotic picking apparatuses are configured to fulfill the order.

Optionally, the system further comprising: a picking station, wherein said picking station comprises at least one robotic picking apparatus; storage for storing containers; a plurality of transportation robots configured to autonomously transport containers from said storage to said picking station.

Another exemplary embodiment of the disclosed subject matter is a method comprising: obtaining an instruction to pick an item from a container; first determining that an operation plan for a robotic picking apparatus cannot be devised autonomously; in response to said first determining, second determining that the operation plan cannot be devised based on additional human provided input; and in response to said second determining, receiving user instructions for remotely controlling the robotic picking apparatus, whereby the robotic picking apparatus is operated in remote operation mode and controlled by a user; and moving the robotic picking apparatus based on the user instructions.

Optionally, the method further comprising sending haptic feedback to the user while the user is controlling the robotic picking apparatus.

Optionally, in response to said second determining, selecting a user out of a plurality of users to control the robotic picking apparatus, wherein said selecting is performed from a plurality of human users located remotely from the robotic picking apparatus.

Optionally, a ratio between a total number of human users that are tasked with assisting or controlling robotic picking apparatuses and a total number of the robotic picking apparatuses is at least 1:100.

Optionally, said first determining comprises: calculating a first confidence measurement of the capability of autonomous determination of the operation plan, and comparing the first confidence measurement with a first threshold; and wherein said second determining comprises: calculating a second confidence measurement of the capability of determination of the operation plan using additional human provided input, and comparing the second confidence measurement with a second threshold.

Optionally, at least one of the first threshold and the second threshold is modified based on availability of human users to provide input.

Optionally, the first threshold is modified based on availability of manned stations for remote assistance; and wherein the second threshold is modified based on availability of manned stations for remote control.

Optionally, the method further comprising obtaining an order to fulfill; and fulfilling the order by instructing the robotic picking apparatus to place items in a shipping container in accordance with the order, wherein said fulfilling comprises: the robotic picking apparatus picking and placing at least one item in the shipping container in an autonomous mode and without user input; and the robotic picking apparatus picking and placing at least one item in a human-assisted mode.

Optionally, the method further comprising obtaining an order to fulfill; and fulfilling the order by instructing the robotic picking apparatus to place items in a shipping container in accordance with the order, wherein said fulfilling comprises: the robotic picking apparatus picking and placing at least one item in the shipping container in a remote-controlled mode; and the robotic picking apparatus picking and placing at least one item in the shipping container in an autonomous mode and without user input.

Yet another exemplary embodiment of the disclosed subject matter is a method comprising: obtaining a instruction to pick an item from a container; computing an estimated cost of operating a robotic picking apparatus in an autonomous mode, wherein the estimated cost of operating the robotic picking apparatus in the autonomous mode is based on a probability of success of operating the robotic picking apparatus in the autonomous mode and estimated cost of damage to the item; computing an estimated cost of operating the robotic picking apparatus in a human-assisted mode, wherein the estimated cost of operating the robotic picking apparatus in the human-assisted mode is based on a probability of success of operating the robotic picking apparatus in the human-assisted mode, the estimated cost of damage to the item and a cost of labor in human-assisted model; computing an estimated cost of operating the robotic picking apparatus in a remote-controlled mode, wherein the estimated cost of operating the robotic picking apparatus in the remote-controlled mode is based on a probability of success of operating the robotic picking apparatus in the remote-controlled mode, the estimated cost of damage to the item and a cost of labor in remote-controlled mode; selecting between the autonomous mode, the human-assisted mode and the remote-controlled mode based on the estimated costs; and operating the robotic picking apparatus to pick up the item from the container in the selected mode.

Yet another exemplary embodiment of the disclosed subject matter is a method comprising: obtaining an order of a customer to fulfill, wherein the order comprises ordered items; instructing one or more transportation robots to transport containers to a picking station comprising a robotic picking apparatus, wherein the containers comprise the ordered items; picking, using the robotic picking apparatus, the ordered items and placing the ordered items in a shipping container, wherein said picking comprises: picking at least one ordered item in an autonomous mode; picking one or more ordered items that cannot be picked in the autonomous mode, wherein said picking the one or more items comprises: for each item of the one or more ordered items, determining whether to utilize a human-assisted mode or a remote-controlled mode for picking the each item; obtaining human input based on the determined mode; and picking the each item in the determined mode using the human input; and transporting the shipping container to the customer; whereby the order is fulfilled by a robotic warehouse with limited human assistance.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
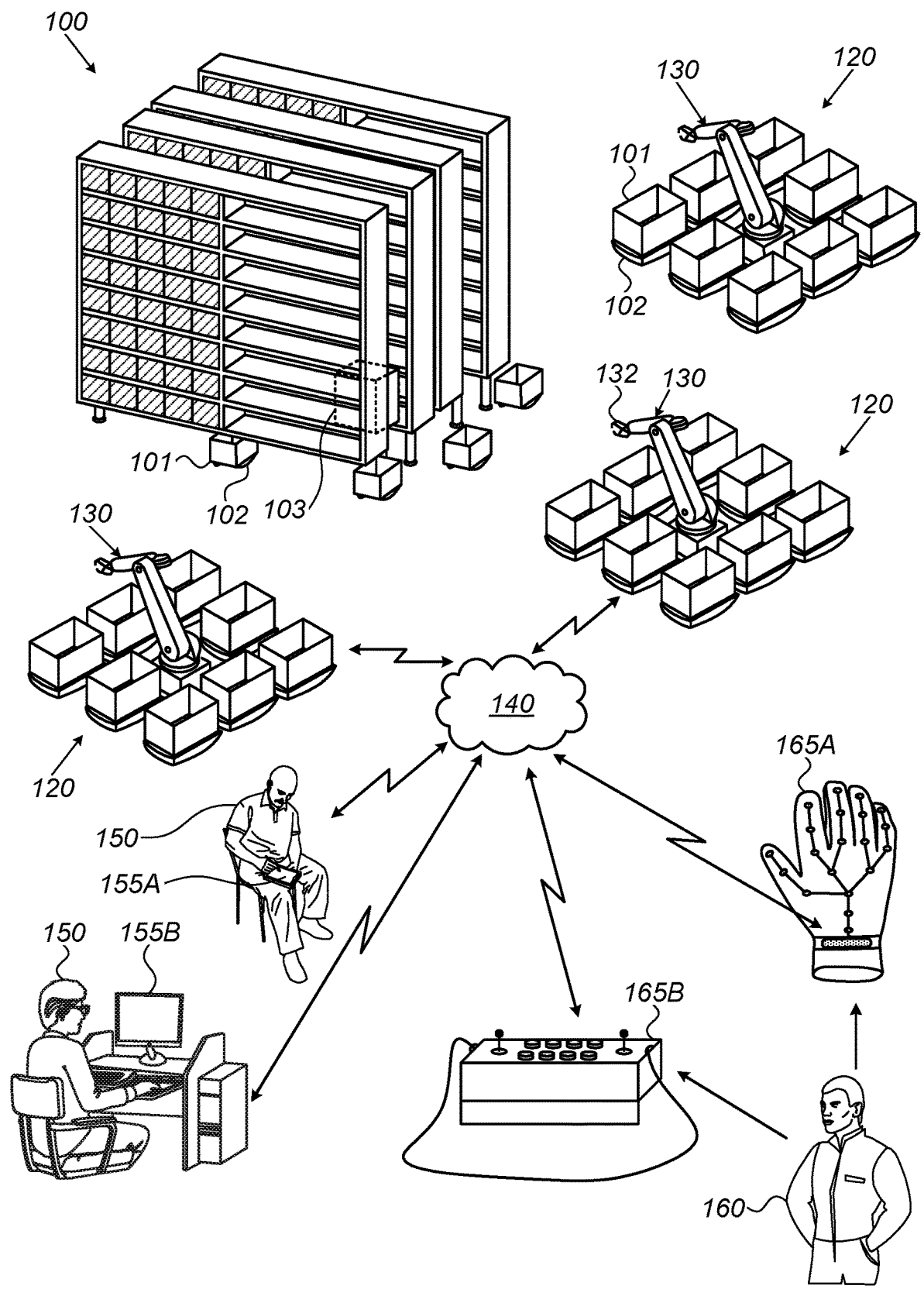
FIG. 1 shows an illustration of a system in accordance with some embodiments of the disclosed subject matter.

One technical problem dealt with by the disclosed subject matter is to provide a system of automated picking that requires limited human intervention. In addition, it may be desired to provide a system where human users are not located physically, so as to improve space utilization. In some exemplary embodiments, in many cases robotic warehouses, such as for example robotic supermarkets, may be located in locations where space is at a premium, and as a result improving space utilization may be a desired goal. Instead of providing a sufficiently large station where a person can work without being claustrophobic yet has convenient human-sized access, one, two or several robotic hands can move products in and out of containers. This can significantly reduce the footprint of the packaging station and therefore of the robotic warehouse.

However, robots are not as good as people at handling soft or unfamiliar products. Though mechanism to grip items exist, and such mechanisms may employ haptic feedback for sensing, the algorithms that manipulate the gripping mechanisms, are sometimes unable to handle items in certain conditions in an adequate manner. For example, the algorithm may apply too much force and damage the product. As another example, the algorithm may apply too little force and allow the product to slip and fall. As yet another example, the algorithm may not be able to determine identify the contour of the product and therefore may not be able to identify it. As yet another example, the algorithm may not be able to correctly choose a gripping point in the product to grip, such as gripping a cone-shaped product near its apex and therefore letting it slip due to its geometric shape. The above are exemplary potential shortcomings of algorithms in few scenarios. Additional shortcomings may be apparent to a person of ordinary skill in the art in view of the present disclosure.

One technical solution is to provide a system comprising a plurality of robotic picking apparatuses may be deployed in picking stations in a robotic warehouse. The robotic warehouse may utilize transportation robots to carry and transport containers from one location to another. The robotic picking apparatuses may be configured to operate in different operational modes.

A first operational mode may be an autonomous mode. In the autonomous mode, the picking operation may be executed without any human intervention or assistance. An operation plan may be determined automatically and executed by the robotic picking apparatus.

A second operational mode may be a human-assisted mode, where limited human assistance may be provided. The human assistance may be additional input that is used for devising the operation plan for the robotic picking apparatus. After such plan is determined, it may be executed automatically without additional user input. As an example, the human assistance may be identifying contour lines of the item to be picked, selecting an item from a bulk container to be picked, selecting a target location where the item is to be placed, manually inputting a characteristic of the product, such as softness level, viscosity level, wetness level, or the like (which may be inputted explicitly, such as by providing a level in a scale, or indirectly such as indicating products having similar characteristic), or otherwise providing limited human assistance that is useful for the determination of the operation plan itself.

A third operational mode may be remote-controlled mode. In remote-controlled mode, a user may remotely control the robotic picking apparatus. The user may be directly control the movements of the robotic picking apparatus. An electronical operation plan may not be devised, and instead the user may instruct the robotic picking apparatus how to move during the picking operation. In some cases, the user may utilize a dedicated device for controlling the movements of the robotic picking apparatus and potentially receiving feedback, such as haptic feedback therefrom. In some exemplary embodiments, the user may utilize one or more camera feeds to see the item to be picked and the state of the robotic picking apparatus, so as to be able to guide the robotic picking apparatus and successfully pick up the item. In some exemplary embodiments, the user may control a portion of the robotic picking apparatus. For example, the robotic picking apparatus may comprise of a robotic arm and a gripping device. The robotic arm may be moved autonomously and the user may control the gripping device exclusively.

In some exemplary embodiments, a system in accordance with the disclosed subject matter may comprise manned stations for remote assistance to a plurality robotic picking apparatuses. A relatively small number of human users may be sufficient to assist a large number of robotic picking apparatuses. For example, a ratio of 1:10, 1:100, 1:1000, or even more, may be achieved. The robotic picking apparatuses may act autonomously most of the times, and when autonomous operation is not possible or its adequacy is not ensured, human assistance may be provided. Different degrees of assistance may be employed, with preference of the human-assisted mode over the remote-controlled mode, as in the human-assisted mode a limited human attention may be required in comparison to the remote-controlled mode. Additionally or alternatively, in human-assisted mode, simpler and cheaper hardware may be used, in comparison to the remote-controlled mode. In some cases, due to the difference in costs of the hardware, there may be more manned stations for remote assistance than manned stations for remote control. In some exemplary embodiments, there may be different users for assisting in different modes or different tasks of the same mode, so as to increase productivity in accordance with the division of labor principle. Additionally or alternatively, different human-input may require use of different input devices, such as a touch-screen or other pointing devices for human-assisted mode in providing assistance to computer vision algorithms, a textual input device for human-assisted mode in providing additional textual data to the algorithm responsible for determining pressure to apply on the item, a remote control mimicking the shape of the robotic picking apparatus for remote-controlled mode, or the like. Additionally or alternatively, different human-input may be provided using different modalities, such as gesture-based modality, pointing device modality, keyboard modality, or the like.

In some exemplary embodiments, a system may comprise of a plurality of robotic warehouses spread around the globe, each of which comprising a large number of robotic picking apparatuses for performing warehouse operations, such as order fulfillment, stock replenishment, or the like. The system may further comprise one or more human-centers, located in in areas where human labor is relatively inexpensive, such as India or China. In the human-centers, a group of users may be prompted to assist, each time a different robotic picking apparatus, potentially using different methods. As a result, expensive labor and real-estate may be replaced by cheap ones, while still operating the robotic warehouses around the globe. Additionally or alternatively, as each robotic picking apparatus may operate in autonomous mode most of the time, a number of humans that is smaller by one or more orders of magnitude than the total number of robotic picking apparatuses employed around the globe, may be sufficient to allow the plurality of robotic warehouses to function correctly.

In some exemplary embodiments, human-assistance may be provided based on information provided to the user, as the user is not located at the same location as the robotic picking apparatus. As a result, the input which the user based her decision may be available to the system. Given the input to the user, features may be extracted therefrom, and a classifier may be trained with a pair of features and label. The label may be the human input given in view of the input. The classifier may provide a prediction of a correct answer and replace the human-assistance gradually. In some exemplary embodiments, the autonomous mode may employ the classifier and avoid relying on human input in similar cases in the future. In some exemplary embodiments, non-autonomous-mode may be used in rare cases, such as when a new item is handled for the first time, when a new type of item is first encountered, when an uncommon combination of items are encountered, or the like. In some exemplary embodiments, the autonomous mode may be used in at least about 90% of the picking operations. In some cases, the autonomous mode may be used in at least 99% of the picking operations. As a result, the amount of human labor required may be limited and the system may scale without requiring increasing manpower.

One technical effect of utilizing the disclosed subject matter is to provide an efficient system for automated picking that can handle any picking task. If a specific picking task cannot be completed automatically, human assistance may be solicited, based on the level of assistance required.

Another technical effect may be to provide for a scalable solution for unmanned robotic warehouses that utilize limited amount of premium real estate and premium manpower.

Yet another technical effect may be to improve the operability of the robotic picking apparatus. The disclosed subject matter may enable the robotic picking apparatus to operate in cases where it was previously impossible. In some cases, based on human assistance, the controller of the robotic picking apparatus may learn how to handle in future cases, similar scenarios. The learning may be global learning that is useful for a variety of robotic warehouses. For example, in case of a new product that is launched, picking assignments of the new item may, initially, be handled using some human intervention. Based on the human assistance in one robotic warehouse, all robotic warehouses may be enhanced to learn how to handle the new item. Similarly, in case where a new task has an uncommon condition, the human assistance may be leveled to not only solve the new task, but also assist in solving similar tasks with similar conditions to the uncommon condition, in any of the robotic warehouses.

Yet another technical effect may be to improve fulfillment of online orders, such as using robotic warehouses that may be deployed within cities, and which may be capable of placing the items in a shipping container without the presence of a human in the robotic warehouses for all types of orders and in all scenarios. The shipping container may then be transported using drones, unmanned transportation devices, or other transportation method, reducing the overall fulfillment time from the placement of the order and until the ordered items reach the customer.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Referring now to FIG. 1 showing an illustration of a system in accordance with some embodiments of the disclosed subject matter.

FIG. 1 exemplifies a robotic warehouse having a Storage 100 for storing containers, such as Container 101. Storage 100 may comprise multiple shelving units for storing bulk containers. Transportation robots, such as Lift Robot 103 and Floor Robot 102 may transport the containers, storing them in Storage 100, such as when new items arrive to the robotic warehouse, and retrieving them, such as for cleanup, replenishment, or order fulfilment. In some exemplary embodiments, the robotic warehouse may be similar to that disclosed in PCT Application PCT/IB2016/053354, filed Jun. 8, 2016, entitled "ROBOTIC INVENTORY HANDLING", published as WO 2016/199,033, which is hereby incorporated by reference in its entirety without giving rise to disavowment. The illustrated embodiment shows a single robotic warehouse. However, the disclosed subject matter is not limited to a single warehouse, and may be applied for any number of warehouses.

The warehouse may comprise one or more Picking Stations 120. In the illustrated embodiment, three picking stations are shown. However, the disclosed subject matter is not limited to such a number. A warehouse may comprise any number of picking stations, ranging from a single picking station to any conceivable number of picking stations.

Each Picking Station 120 may comprise a Robotic Picking Apparatus 130. In the illustrated embodiment, a one-to-one ratio of robotic picking apparatuses to picking stations is shown. However, the disclosed subject matter is not limited to such a ratio, and in each station there may be any number of robotic picking apparatuses.

Robotic Picking Apparatus 130 may be configured to pick items from containers (101) and place them in other locations, such as another container. The containers may be of the same size or of different sizes. For example, there may be several alternative container sizes for bulk containers, and different alternative container sizes for shipping containers. In some exemplary embodiments, Robotic Picking Apparatus 130 may be controlled by a controller (not shown) that is configured to receive input from sensors (not shown), such as video cameras, pressure sensors, Infrared (IR) cameras, or the like, and control the operation of Robotic Picking Apparatus 130. In most cases, controller may employ an algorithm to formulate an operation plan. The plan may comprise a set of movements of Robotic Picking Apparatus 130 to be performed in order to perform the picking operation, to place the item in the new location, or the like. In some exemplary embodiments, Robotic Picking Apparatus 130 may be mobile, such as may be mounted on a wheeled platform, and the operation plan may comprise planned route for the mobile Robotic Picking Apparatus 130. Additionally or alternatively, the operation plan may indicate forces to be applied, such as amount of pressure to be used when gripping the item.

In some exemplary embodiments, an operation plan cannot be devised automatically. In some cases, additional human input, may be sufficient to devise the plan. For example, the plan may not be devised because the item cannot be located by the computer vision algorithm in picture of the container. In such a case, human assistance stations in a remote site may be contacted via a Network (140). User 150 in the human assistance station may be prompted to provide human assistance, such as indicating, using a touchscreen of a Tablet 155A or using a point device of a Desktop Computer 155B, where the item is located. The picture or a video feed from the sensors may be shown to User 150 on the screen, and the user may point on the item, indicate its contour and visible borders, or the like. Additionally or alternatively, the human assistance may include pointing to a location where to place the item, such as the target location within a half-packed container, indicating above which items the picked item should be placed. The placement decision may be based on considerations such as weight, firmness, boxing, sizes of the items, or the like. Additionally or alternatively, a selection algorithm for selecting which item to pick up out of a plurality of identical items (e.g., in a bulk container) may be unable to make a selection. Although the items are identified by the computer vision algorithm, the selection of an item to pick up may be non-trivial due to the relationship between the items and potential implications of picking up each items, such as shifting the location of other items. In some cases, the selection algorithm may require assistance in case of non-identical items of the same type. For example, in case of a bulk container comprising tomatoes, each tomato may unique, and the selection algorithm may not be confident in a selection of one tomato over the others. The user may select the item, such as by pointing to the selected on a screen. Additionally or alternatively, a movement route of the robotic picking apparatus may not be determined automatically. The user may assist by selecting a target destination, changing suggested legs in the route, setting minimal and maximal speed limits, or the like. Additionally or alternately, softness level of the item or other characteristics thereof, may be required for the algorithm to devise the operation plan. If the algorithm cannot assess in sufficient confidence (e.g., confidence level above a threshold) the characteristic, the user may be prompted to provide the response. In some exemplary embodiments, the threshold may depend on the expected outcome of using a wrong characteristic. For example, if the characteristic is softness, then the damage may be expected to be greater than if the characteristic is color, as picking the item automatically when mistaking the softness characteristic may cause the item to be damaged in the process with higher likelihood than with the color characteristic. As another example, if the characteristic is softness and the estimation is that the item is soft, the threshold may be lower than if the estimation is that the item is firm, as if the latter is erroneous, the expected damage to the item is higher. The user may be shown the picture of the item, estimated characteristic, confidence level, and the like. The user may then confirm the estimation or modify it. The user may utilize an objective scale to indicate the characteristic. As another option, the user may select another product, indicating that the current item has similar characteristic to the selected item. In some cases, the user may indirectly indicate the characteristic by indicating the relationship between the item and other items. For example, the user may be asked about the softness of an orange. The user may be prompted with a picture of a tomato, and asked whether the item of interest, the orange, is softer or harder than the tomato. After indicating that orange is harder than tomato, the user may be asked to indicate relationship with a tin can, and may indicate that the orange is softer than the tin can. In such a manner, using other objects, the user may indicate the softness level in a relatively accurate manner, and without using an objective scale.

In some exemplary embodiments, in case the operation plan cannot be devised even after receiving the human input, or if it is determined a-priori that additional input would not be sufficient to devise the plan, remote-control mode may be employed. Human telecontrol stations in the remote site may be contacted via Network 140. In some exemplary embodiments, User 160 may utilize the same devices as User 150 to control the Robotic Picking Apparatus 130. In such a case, the same user may provide assistance in human-assisted mode and tele-operate the Robotic Picking Apparatus 130, in remote-controlled mode. In some exemplary embodiments, users providing input in human-assisted mode may be different than users performing teleoperation of the picking apparatus. This could be due to an improved efficiency and utilization, by having each user specialize in performing a specific task. Additionally or alternatively, this may be the case if different tools are used to provide input in the different modes. For example, User 160 may utilize dedicated devices to control the Robotic Picking Apparatus 130, such as a glove (165A) for precisely controlling Gripping Device 132, or a remote control (165B). Additionally or alternatively, human telecontrol stations may employ different modalities than those employed by human assistance stations.

In some exemplary embodiments, the determination whether to contact a human assistance station, human telecontrol station, or the like, may be based on the availability of human users. If all users are currently busy and unavailable, the minimal confidence threshold of an estimation, such as estimation of the computer vision algorithm, the selection algorithm, or the like, may be reduced, thereby relying on estimations that are less reliable. However, it may be preferred to perform the action or at least attempt performing it, without waiting for a human user to become available, and therefore reduce the overall time required to perform the task at hand. Similarly, if no users are available for teleoperation, the minimal confidence level in the adequacy of the operation plan may be reduce, thereby attempting to autonomously perform plans that have higher probability to fail than what is usually acceptable. In some exemplary embodiments, in case all human assistance stations are busy but some human telecontrol stations are not, the Robotic Picking Apparatus 130 may be operated in remote-controlled mode, even though it could have been operated in human-assisted mode. It is noted that such an embodiment may improve efficiency of the system, improve utilization of the human manpower resource, and may reduce the overall time required to perform all tasks.

Figure 2:
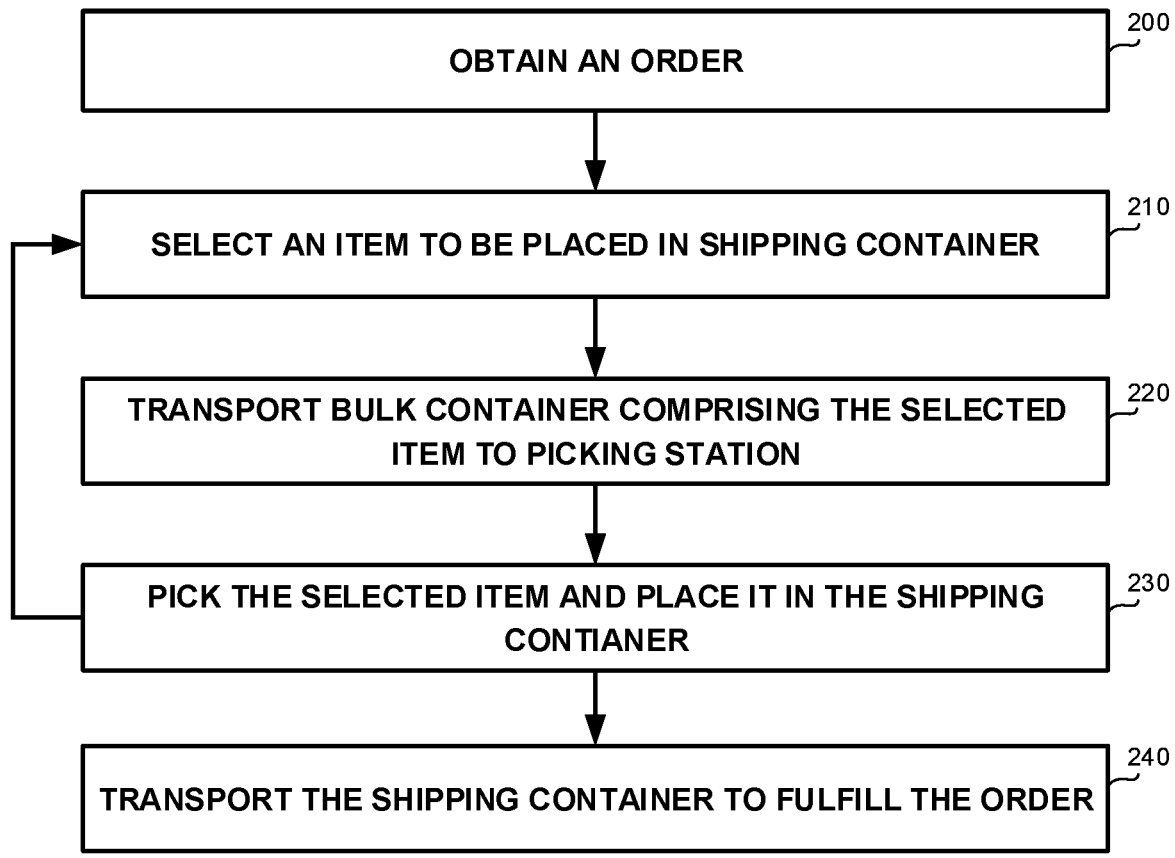
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 200, an order is obtained. The order may define a set of ordered items to be shipped to a customer making the order. It is noted that illustrated figure relates to fulfilling a customer order, however, similar methods may be employed to perform other warehouse processes that involve the moving of items from or into containers.

On Step 210, an item to be placed in the shipping container is selected. In some exemplary embodiments, the order may describe an order of placing the items in the containers, such as which items are placed in the bottom of the container and which are placed above. Such placement order may impose an order of selection of the items. In some exemplary embodiments, the placement order may be automatically determined, such as disclosed in an international patent application being concurrently filed, entitled PACKING AND DELIVERY OF GOODS AMONG MULTIPLE STATIONS, which claims the benefit of US U.S. Provisional Application No. 62/457,912 filed Feb. 12, 2017, entitled "DIVIDING ITEMS ORDERED AMONG MULTIPLE PACKING STATIONS", both of which are hereby incorporated by reference in their entirety without giving rise to disavowment.

On Step 220, a bulk container comprising the selected item may be transported to a picking station. The bulk container may be retrieved by a lift robot from a shelving unit of the storage, and may be mounted on a floor robot to be transported to the picking station. It is noted that other combination of robots, including a single multi-purpose robot, may be employed to transport the bulk container from storage to the picking station. The bulk container may comprise a plurality of items of the type of the selected item. For example, a plurality of oranges, if the selected item is an orange; a plurality of beer bottles of a brand, if the selected item is a beer bottle of the brand; or the like. In some cases, the bulk container may comprise a plurality of items of different types and may not necessarily comprise only items of the selected type.

In some exemplary embodiments, the picking station may be unmanned and may comprise one or more robotic picking apparatuses. In some exemplary embodiments, the picking station may also comprise a shipping container, such as a container that will be transported, manually or using one or more robots, to the customer. In some exemplary embodiments, if at the beginning of processing of an order, there is no shipping container at the picking station handling the order, an empty shipping container may be transported thereto by a robot, such as by extracting the shipping container from the storage.

On Step 230, the selected item is picked up from the bulk container and placed in the shipping container, by the robotic picking apparatus. In some exemplary embodiments, the picking and placing may be performed fully autonomously and without user intervention. In some exemplary embodiments, and optionally, only at relatively rare cases, user assistance may be solicited. Remote users located at one or more remote sites may be prompted to assist the robotic picking apparatus. In some cases, different types of assistances and level of engagement may be available. In human-assisted mode, the user may provide additional input on top of sensor input that can be used to automatically determine an operation plan for the robotic picking apparatus. If such input is not practical, such as because it would not be sufficient to determine a plan, or because there are no available users that can provide such input, input of a different form may be solicited. In some exemplary embodiments, users utilizing remote-control devices may be prompted to remotely operate the robotic picking apparatus in remote-controlled mode.

In some exemplary embodiments, Steps 210-230 may be performed iteratively until all items of the order are placed in the shipping container.

On Step 240, the shipping container may be transported to the customer, thereby fulfilling the order. In some exemplary embodiments, the transportation of the shipping container may be performed by unmanned drones and robots, such as the floor robots, airborne drones, or the like. Additionally or alternatively, the transportation may utilize transportation services, such as provided by UPS™, DHL™, or the like, and hence may or may not be performed, at least in part, by humans.

Figure 3A:
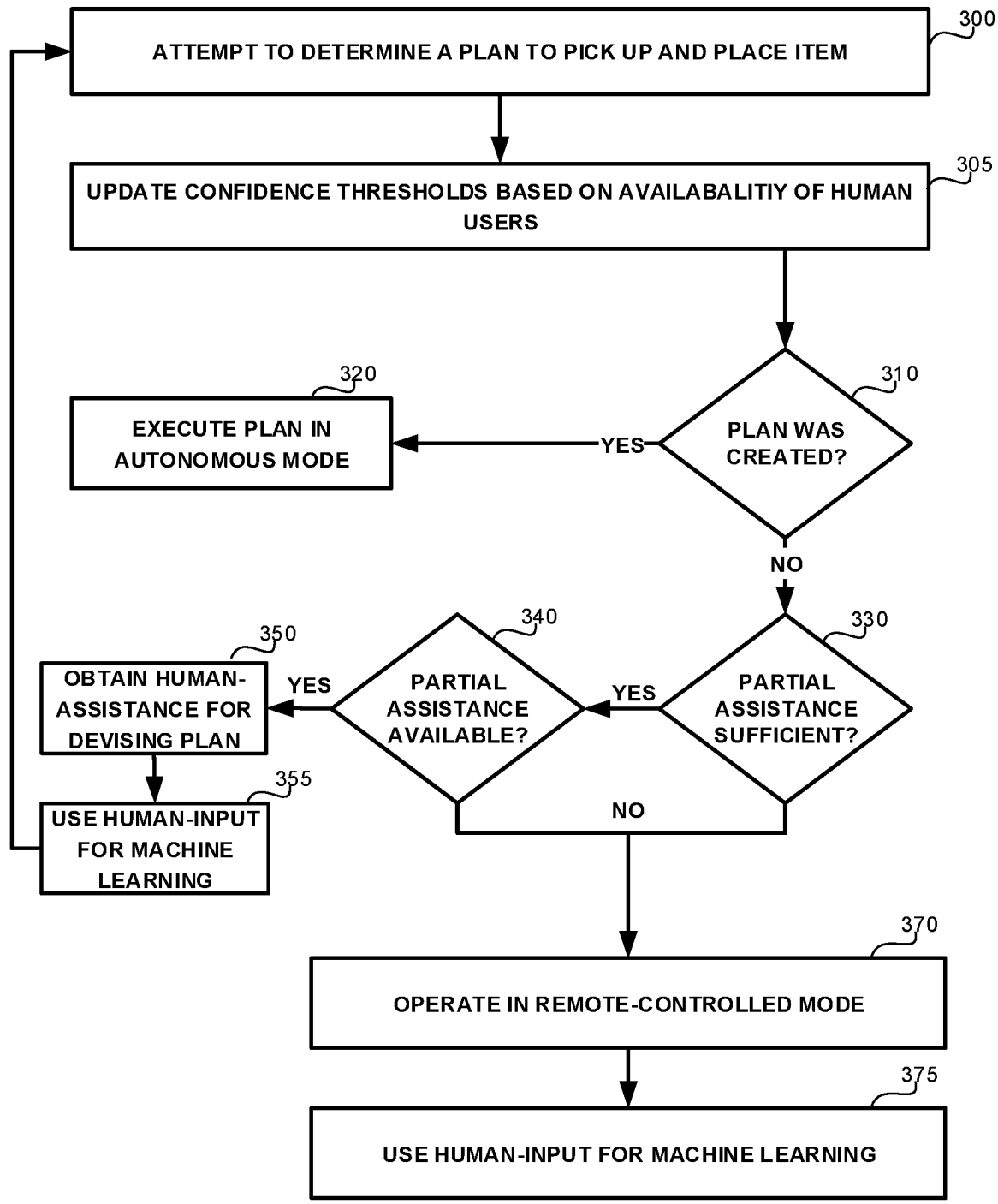
FIG. 3A shows a flowchart diagram of a method, in accordance with some exemplary embodiments of the disclosed subject matter.

Reference is now made to FIG. 3A, which shows a flowchart diagram of a method, in accordance with some exemplary embodiments of the disclosed subject matter.

On Step 300, an operation plan for the robotic picking apparatus is determined. In some cases, a software component may be configured to attempt to formulate the operation plan based on inputs available from sensors at the vicinity of the robotic picking apparatus, such as camera, microphone, pressure sensors, or the like. In some cases, the plan may require applying a series of different algorithms, such as computer vision algorithms for identifying the item in the image; a selection algorithm for selecting which of a plurality of items of the same type to pick up (e.g., based on the heap configuration and on potential movements in response to picking thereof); an algorithm to determine amount of force to apply on the picked-up items (e.g., based on their perceived firmness); a placement algorithm to determine a place to place the item (e.g., a location within a target container, based on the current items placed therein and based on additional items to be placed after the current item); a route planning algorithm for planning a route for the robotic picking apparatus, such as to move to a location to pick up the item, to move to a location to drop the item, or the like; and so forth.

In some exemplary embodiments, an attempt may be made to formulate an operation plan. The attempt may be successful and a suggested operation plan may be devised. Additionally or alternatively, the attempt may fail and no suggested plan may be available.

On Step 310, a determination whether an adequate plan was created may be made. In some exemplary embodiments, if a suggested operation plan was determined, a confidence level in its successful application may be calculated. The confidence level may be based, for example, on a history of successful or unsuccessful execution of operation plans. For example, if the success rate of picking up a tomato is below about 80%, it may be determined that the operation plan is inadequate. Additionally or alternatively, the success rate of a suggested trajectory may be computed and used (e.g., 10% that a tomato that is picked up in an access trajectory of a generally diagonal vector would be smashed).

In some exemplary embodiments, the confidence threshold may be different for different items or orders. For example, confidence threshold for fragile items may be higher than for robust items. As another example, confidence threshold for expensive items may be higher than of cheap items. As yet another example, confidence threshold of items with low inventory availability may be higher than confidence threshold for items that are full in stock. Such different thresholds may be used to provide for improved resource allocation of human users, and reduced estimated cost of damage to items when automatically executing operational plans. The estimated cost of the damage may include the cost of the damaged goods itself, the probability of damaging the item, the probability of rendering the order unfulfillable until inventory is replenished, cost and probability of cleanup, cost and estimated probability of wasted time, estimated cost of adversely affecting the item without damaging it (e.g., wrinkling or otherwise deforming the package without damaging its content), or the like.

In some exemplary embodiments, adequacy may be computed by taking into account various parameters, such as expected probability of success of the plan, expected probability of success of using a human user, cost of labor, cost of mistake in execution, probability in mistake in execution, or the like. In some exemplary embodiments, if the excepted probability of success of the plan is at least as high as an excepted probability of success of a human remote-controlling the device, the plan may be considered adequate. If, on the other hand, there is an advantage to using a human (e.g., higher probability of success to human tele-control or to human assistance), then the determination may be made by computing a net value of utilizing human assistance. In some exemplary embodiments, the net value of human-assistance may be computed by computing estimated cost of execution using human assistance and subtracting cost of automated execution: $NV_{mode}=EC_{mode}-EC_{auto}$, where $NV_{mode}$ is the net value of using mode (e.g., human-assisted mode, remote-controlled mode) instead of using the autonomous mode, $EC_{mode}$ is estimated cost of using mode (e.g., autonomous mode, human-assisted mode, remote-controlled mode, or the like). $EC_{mode}=(1-p_{mode}) \cdot D_i + L_{mode}$, where $p_{mode}$ is the probability of failure causing damage when using mode, $D_i$ is the expected damage to item i in case of a failure, $L_{mode}$ is the cost of labor in the mode (0 is in case of autonomous mode). In some cases, a different types of damages may be referred to and each may have a different probability of occurring (e.g., $EC_{mode}=\Sigma_j (1-p_{mode}^j) \cdot D_i^j + L_{mode}$, where $p_{mode}^j$ is the probability of damage of type j when operating in mode, and $D_i^j$ is the expected damage to item i when damage of type j occurs). In some exemplary embodiments, the selection of the human-assisted mode may be based on the $NV_{human-assisted}$ being positive. Additionally or alternatively, $EC_{auto}$, $EC_{human-assisted}$ and $EC_{remote-controlled}$ may be compared and the mode may be selected based on the mode having the minimized associated estimated cost.

It is noted that in some cases, an operation plan may appear to be adequate and upon execution, such plan may fail. In such a case, Step 310 may be re-performed and in such a case, the determination may be that there is no adequate plan at hand.

Additionally or alternatively, instead of attempting to devise a plan automatically and determine that such attempt was unsuccessful, it may be a-priori estimated, given the sensor inputs available and the task at hand, whether the system is capable to autonomously determine the operation plan. Such estimation may be accompanied by a confidence level that may compared with a threshold confidence. If the system estimates that a plan can be devised autonomously, with a confidence level higher than the minimal threshold (e.g., above 80% confidence), than the plan may be autonomously determined and utilized.

It will be determined that in the present application, a confidence measurement of a capability of autonomous determination of the operation plan relates to a confidence measurement of an estimation prior to attempt to create a plan and also to a confidence measurement in the adequacy of a determined plan posteriori.

On Step 320, in case an adequate operation plan was automatically devices, the plan is executed by the robotic picking apparatus in autonomous mode. Otherwise, the task at hand may not be performed in the autonomous mode and Step 330 may be performed.

On Step 330, it may be determined whether partial assistance is sufficient to overcome the inadequacy of the operation plan.

In some exemplary embodiments, the failure to formulate an operation plan may be caused due to specific failure of a specific algorithm or lack of confidence in the products of such algorithm. In such a case, human input can be solicited to overcome the deficiencies of such algorithm and generate the operation plan using the human input. For example, a human user may be contacted and shown the image of the bulk container. The user may then identify contours of the item to be picked. As another example, the user may be shown the image of the bulk container with highlighted contour lines of each identified item, and the user may select an item to be picked up out of the plurality of identified items (or indicate that the item to pick up was not automatically identified and manually identify it). As yet another example, the user may indicate one or more gripping points in the item, where the gripping mechanism is to apply pressure in order to pick up the item. For example, the user may indicate two gripping points in opposite locations in the item, in order for a gripping mechanism emulating an elephant trunk to be able to pick up the item. Additionally or alternatively, the user may indicate a location where a suction cup can be placed in order to apply vacuum to pick up the item. As yet another example of human assistance, an image showing the inside of the shipping container may be presented to the user, who may indicate a location to place the item after picking it up. As yet another example, the user may be prompted to indicate a property of the item that is selected to be picked. For example, firmness of the item may be indicated. Additionally or alternatively, a range of potential firmness properties, such as in case of a tomato which may be hard or soft, depending on its ripeness. Additionally or alternatively, the user may indicate the property after receiving feedback. For example, the robotic picking apparatus may attempt picking up the item, and tactile feedback may be provided to the user to verify or modify her initial estimation.

In some exemplary embodiments, human assistance may be solicited when the algorithm provides an estimated result, however, the confidence level in the estimation is below a threshold. In such a case, the user may be solicited to verify or nullify the estimated result that is automatically determined. For example, the user may be prompted to verify that the estimated contour of the item was indeed correctly identified.

In some exemplary embodiments, such human assistance is local and relatively minimal to specific problems that the algorithms encountered. If given such additional input, automated process may determine and execute a plan, Step 350 may be performed.

In some exemplary embodiments, the determination whether partial assistance is sufficient may be performed using a prediction model, a classifier, or the like. Confidence measurement of the prediction may be used so as to ensure relying on the prediction only given a strong enough confidence in the prediction.

On Step 350, a human user is prompted to provide the human assistance. In some exemplary embodiments, the user may be located in a remote site, such as in a service center located in a different country. The user may be in a manned station for remote assistance.

In some exemplary embodiments, the user may be selected from a plurality of users that man such stations. In some cases, the user may be selected based on her availability, historic performance metrics (e.g., how fast and correct the user solves problems similar to the problem at hand), or the like.

The user may provide her assistance, and based thereon, a plan to pick up the item may be determined (Steps 300-310) and potentially used autonomously (320). In some cases, human-assistance may be solicited once more (330-350). If in the end, an operation plan is determined using the sensor input combined with additional human input, and executed without user control, then the robotic picking apparatus may be referred to as operating in human-assisted mode.

If, on the other hand, it is determined that partial assistance is insufficient to create an adequate plan, then the robotic picking apparatus may be operated in remote-controlled mode (370).

On Step 370, a user may be prompted to telecontrol the robotic picking apparatus. In some exemplary embodiments, the user may be in a manned station for remote control, at a remote site. The user may be selected based on her availability, historic performance in similar tasks, or the like. The user may utilize dedicated remote control apparatuses for controlling the robotic picking apparatus. Inputs from the sensors of the robotic picking apparatus may be provided to the user, and the user may, in response, provide control instructions to the robotic picking apparatus. In some exemplary embodiments, haptic feedback may be provided to the user to allow her to determine the correct amount of pressure to apply on the item.

In some exemplary embodiments, machine learning may be employed to improve the performance of the system over time. In some exemplary embodiments, control instructions in remote-controlled mode (375) may be used to improve the capabilities of the planning module. In some exemplary embodiments, the control instructions may be viewed as an operation plan that could have been executed automatically. Once the task is completed, such operation plan may be used to train the planning module to improve it so that if a similar scenario is encountered again, the planning module may be capable of providing an adequate operation plan without user intervention. Additionally or alternatively, input of the human-assisted mode may be utilized to improve the algorithms used by the planning module. For example, computer vision algorithms may be trained using the image shown to the user and the human input provided by the user, so that in future cases, if similar cases are encountered again, the system may solve the problem in a high enough confidence without human assistance.

In some exemplary embodiments, employing machine learning techniques may improve the system gradually to allow picking of new items and items in new scenarios. In some exemplary embodiments, the learning may be performed based on human input provided for one warehouse and applied to a second warehouse. For example, if a new item becomes available at several warehouses, it may be sufficient for a human user to assist the system once in identifying the item with respect to one warehouse, and after such assistance, all the warehouses may be capable of automatically handling such item without human assistance.

In some exemplary embodiments, the system may be biased towards operating in autonomous mode, and if such operation is not possible towards using human-assisted mode rather than remote-controlled mode. In some cases, availability of human users to provide assistance may affect the biasing scheme of the system. In some exemplary embodiments, in case of low availability of human users to assist (in either of the human-associated modes), borderline operational plans may be considered as adequate. In some exemplary embodiments, in case there are no available human users, the confidence threshold may be reduced (305), such that operational plans with a confidence measurement that is below the regular threshold but above the modified threshold may be considered as adequate. For example, instead of requiring a confidence if 80% or more, a plan with 75% confidence may be considered adequate in low availability cases. In some exemplary embodiments, in case there is high availability of human users that can provide input for human-assisted mode, but low availability of users that can tele-operate the robotic picking apparatus, confidence thresholds for determining that partial assistance is sufficient may be modified, to enable use of human-assisted mode in cases where under regular conditions, remote-controlled mode would be used. Additionally or alternatively, in case partial assistance is not available (340), remote-controlled mode may be used instead thereof. In some exemplary embodiments, such modifications increase overall utility of the system as a whole. Instead of relying on specific form of assistance and waiting until relevant resources become available, alternative methods may be employed. In such cases, less-optimal plans may be executed and goods may be damages in the process. As such, the modification of thresholds may be different for different items, such as depending on their cost or value, depending on their estimated damage when dropped, or the like. For example, the confidence threshold for a fragile artifact may not be modified while the confidence measurement for robust items may be modified. As another example, the confidence threshold of an expensive ROLEX™ watch may not be modified or may be modified using a different modification scale than the modification of a less expensive unbranded watch, so as to result in a higher confidence measurement for the branded watch.

Figure 3B:
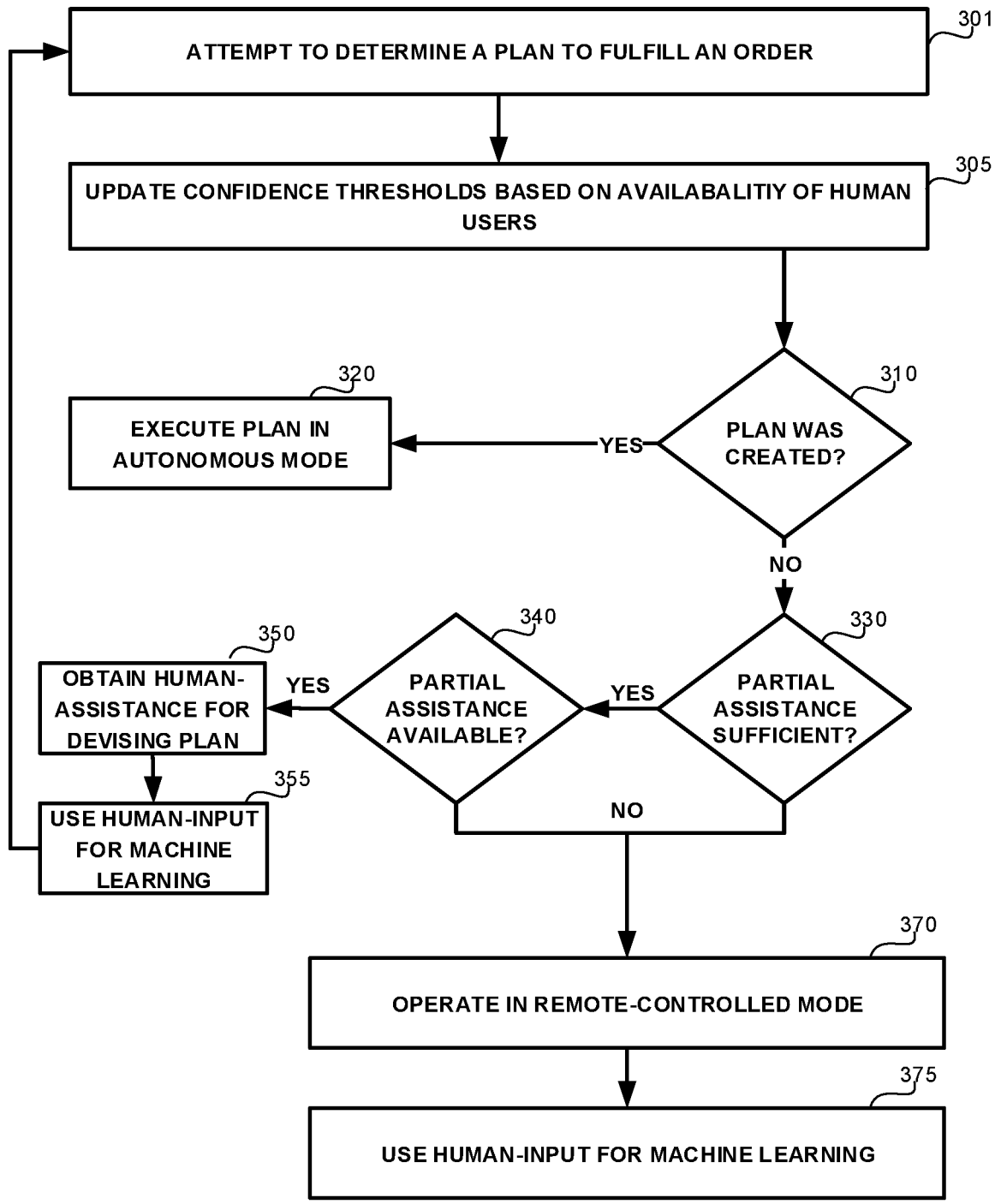
FIG. 3B shows a flowchart diagram of a method, in accordance with some exemplary embodiments of the disclosed subject matter.

Reference is now made to FIG. 3B, which shows a flowchart diagram of a method, in accordance with some exemplary embodiments of the disclosed subject matter. FIG. 3B shows a method similar to that of FIG. 3A. However, instead of determining a plan in a step-by-step manner, by planning each item pick up task individually, in the illustrated method of FIG. 3B, a plan to fulfill an entire order is devised (301).

Figure 4:
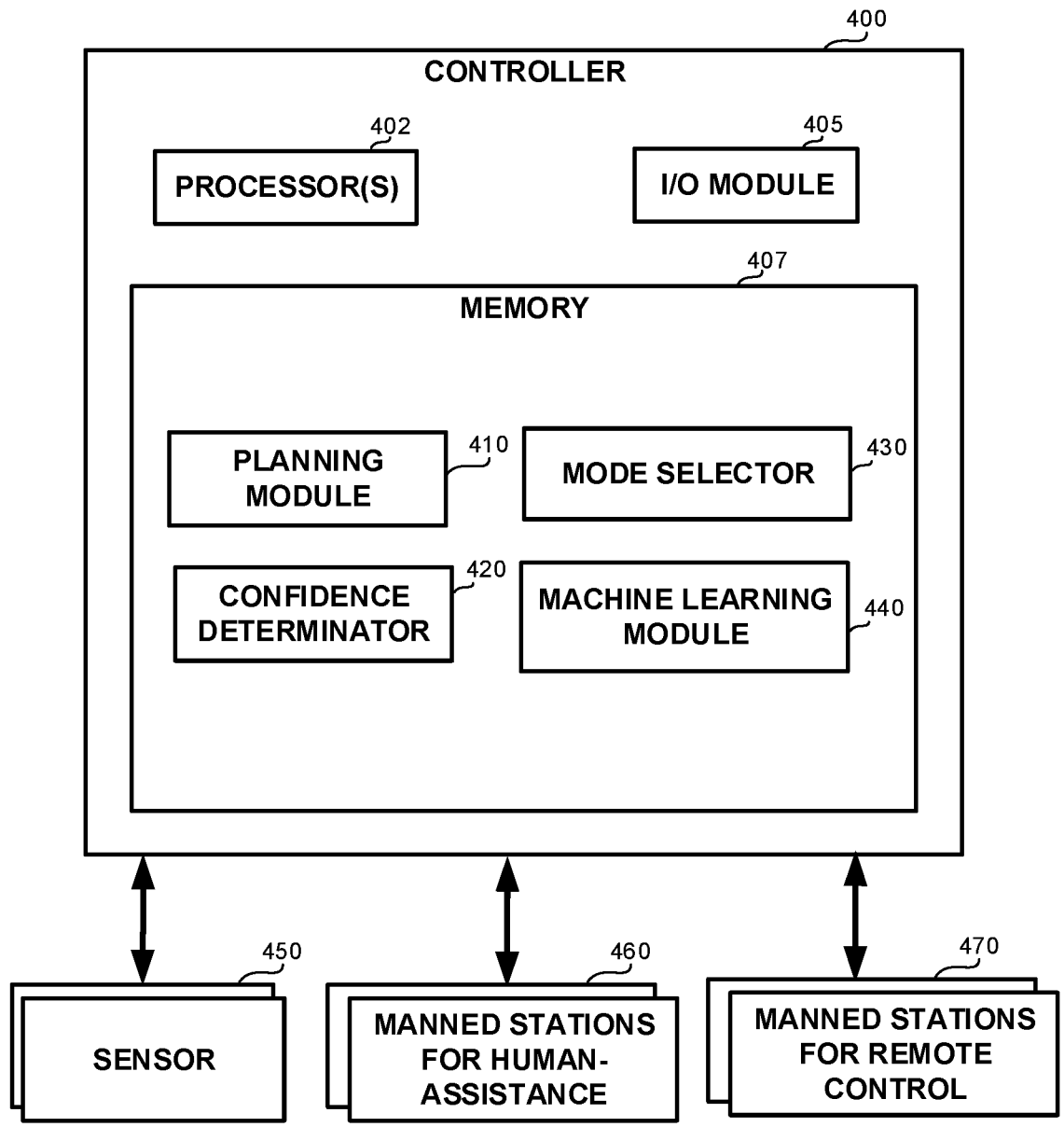
FIG. 4 shows a block diagram of a controller, in accordance with some exemplary embodiments of the disclosed subject matter.

Referring now to FIG. 4 showing a block diagram of a controller, in accordance with some exemplary embodiments of the disclosed subject matter. A Controller 400 may be configured to support parallel user interaction with a real world physical system and a digital representation thereof, in accordance with the disclosed subject matter.

In some exemplary embodiments, Controller 400 may be deployed within the robotic warehouse itself, different Controllers 400 may be deployed, each of which controlling a different set of one or more robotic picking apparatuses. Additionally or alternatively, Controller 400 may be deployed in a remote location, such as in a cloud server, connectable to the robotic picking apparatuses via a computerized network.

In some exemplary embodiments, Controller 400 may comprise a Processor 402. Processor 402 may be a Central Processing Unit (CPU), a microprocessor, an electronic circuit, an Integrated Circuit (IC) or the like. Processor 402 may be utilized to perform computations required by Controller 400 or any of it subcomponents.

In some exemplary embodiments of the disclosed subject matter, Controller 400 may comprise an Input/Output (I/O) module 405. I/O Module 405 may be utilized to provide an output to and receive input from a user, such as, for example obtain information from Sensors 450 at the vicinity of the robotic picking apparatus, to communicate with, send data to and receive instructions from manned stations, such as Manned-Stations for Human-Assistance 460 and Manned-Stations for Remote Control 470, or the like.

In some exemplary embodiments, Controller 400 may comprise Memory 407. Memory 407 may be a hard disk drive, a Flash disk, a Random Access Memory (RAM), a memory chip, or the like. In some exemplary embodiments, Memory 407 may retain program code operative to cause Processor 402 to perform acts associated with any of the subcomponents of Controller 400. Memory 407 may retain the order, including the ordered items, the order of picking up items, or the like. Memory 407 may retain the operational plan. Additionally or alternatively, Memory 407 may retain history of operational plans, outcomes thereof, training dataset obtained based on user input, such as verification of automated determination, user instructions, or the like.

Planning Module 410 may be configured to plan an operational plan for picking up and item and placing it in a different location. Planning Module 410 may be configured to employ one or more algorithms, such as selection algorithm, computer vision algorithm, planning algorithm, route planning algorithm, or the like. Planning Module 410 may be configured to utilize inputs from Sensors 450 to formulate the operational plan. Additionally or alternatively, Planning Module 410 may output a confidence measurement in the successfulness of the determined plan. Additionally or alternatively, Planning Module 410 may be utilize additional input from a human user, such as provided by Manned Stations for Human-Assistance 460, to determine the plan. The Planning Module 410 may utilize the human input to override, modify, or otherwise change an automated determination by Planning Module 410. Additionally or alternatively, the human input may be used to provide a parameter where none of the algorithms are capable of providing it automatically, such as when the item is not identified by any of the employed computer vision algorithms. Additionally or alternatively, the human input may be used to verify borderline automated determinations.

Confidence Determinator 420 may be configured to set a confidence threshold. The confidence threshold may be used for determining whether a plan is adequate. The confidence threshold may be used for determining whether a determination that partial assistance can be used is reliable. In some exemplary embodiments, different confidence measurements may be used for different purposes. Confidence Determinator 420 may be configured to set different confidence measurements for different items, such as depending on their cost, stock availability, robustness, or the like. Confidence Determinator 420 may be configured to modify the confidence based on availability of human users. In some exemplary embodiments, availability of Manned Stations for Human-Assistance 460 may affect the confidence threshold of when remote assistance is solicited. Additionally or alternatively, availability of Manned Stations for Human-Assistance 460 may affect confidence threshold of when a plan is considered adequate. Additionally or alternatively, availability of Manned Stations for Remote Control 470 may affect confidence threshold of when a plan is considered adequate, of when partial remote assistance is solicited, or the like.

Mode Selector 430 may be configured to select a mode of operation for a robotic picking apparatus. Mode Selector 430 may be configured to select from one of at least three modes of operation: an autonomous mode, a human-assisted mode, and a remote-controlled mode. In some exemplary embodiments, Mode Selector 430 is configured to bias the selection towards autonomous mode. Additionally or alternatively, Mode Selector 430 may be configured to bias the selection of human-assisted mode over remote-controlled mode. In some exemplary embodiments, Mode Selector 430 may be configured to make the mode selection based on availability of manned stations that can provide assistance or instructions (460, 470). Mode Selector 430 may be configured to determine the mode based on expected cost of failure of the operational model, such as probability of damage, cost of item, probability of lack of replacement item, or the like.

Machine Learning Module 440 may be employed to gradually improve performance of the robotic picking apparatuses. Machine Learning Module 440 may utilize human input obtained from manned stations (460, 470) to improve automated determination of Planning Module 410. In some exemplary embodiments, a feature vector may be extracted from the input of the Sensors (450) that is relayed to the manned stations (460, 470). A label for the feature vector may be determined based on the human input, such as a solution to a particular problem posed in the human-assisted mode, a set of control instructions provided in the remote-controlled mode, or the like. The pair of feature vectors and associated label may be provided for training a prediction model and improving its performance. Additionally or alternatively, the pair may be used to verify or refute automatically determined values to provide a feedback on the success rate of each algorithm. Other machine learning techniques may be employed to utilize the human-verified data.

It is noted that in some embodiments, machine learning may be employed in a center location, such as in a cloud server. The cloud server may train its predictive models and update the predictive models in various Controllers 400.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
a plurality of robotic picking apparatuses configured to pick an item from a container and place the item in a different place, wherein each robotic picking apparatus is configured to operate in one of at least three operational modes: an autonomous mode, a human-assisted mode, and a remote-controlled mode,
wherein in the autonomous mode, the robotic picking apparatus is configured to automatically determine an operation plan in order to pick the item from the container and place the item in the different place and execute the operation plan without input from a human,
wherein in the human-assisted mode, the operation plan is determined using input from a human and the operation plan is executed automatically without additional input from a human, wherein in the human-assisted mode, the operation plan is determined using the input from a human that is used in the human-assisted mode, comprises at least one of:
- a user indication of the item in the container, whereby assisting a computer vision algorithm to identify the item;
- a user selection of the item between a plurality of items, whereby assisting a selection algorithm to select the item to be picked;
- a user indication of a softness level of the item, whereby assisting in determining amount of force to apply on the item during picking thereof; and
- a user indication of a location to put the item, whereby assisting a placement algorithm to determine where to place the item;

wherein in the remote-controlled mode, movements of the robotic picking apparatus are controlled directly by a remote human user;

wherein said plurality of robotic picking apparatuses are connectable over a network to a remote site, wherein in the remote site, human users are capable of providing input to said plurality of robotic picking apparatuses, wherein the input provided by the human users is transmitted to said plurality of robotic picking apparatuses over the network, wherein the input provided by the human users comprises input for the human-assisted mode and commands for remote controlling the robotic picking apparatus in the remote-controlled mode.

2. The system of claim 1, wherein a controller is configured to select an operation mode of an apparatus of said plurality of robotic picking apparatuses from the at least three operational modes, wherein said controller is configured to give preference to the autonomous mode over the human-assisted mode and the remote-controlled mode, wherein said controller is configured to give preference to the human-assisted mode over the remote-controlled mode.

3. The system of claim 1, wherein a controller is configured to:
- obtain sensor input from a plurality of sensors at a vicinity of a robotic picking apparatus of said plurality of robotic picking apparatuses;
- determine a confidence measurement for the operation plan, wherein the operation plan is automatically determined using the sensor input;
- in case the confidence measurement is above a threshold, provide the operation plan for execution by the robotic picking apparatus in the autonomous mode;
- in case the confidence measurement is below the threshold, select one of human-assisted mode or remote-controlled mode for the robotic picking apparatus.

4. The system of claim 3, wherein said controller is configured to select human-assisted mode or remote-controlled mode based on a determination of whether human provided input can be used to determine the operation plan.

5. The system of claim 3, wherein said controller is configured to select between the autonomous mode, the human-assisted mode and the remote-controlled mode based on an estimated probability of success of operating in the autonomous mode, an estimated probability of success of operating in the human-assisted mode, and an estimated probability of success of operating in the remote-controlled mode.

6. The system of claim 3, wherein said controller is configured to utilize human input to improve capabilities of the robotic picking apparatus in autonomous mode, whereby the autonomous mode is improved gradually based on human provided inputs of different types to allow picking of new items and items in new scenarios.

7. The system of claim 1, wherein the remote site is configured to be manned by a number of human users for remotely assisting or controlling said plurality of robotic picking apparatuses, wherein a ratio between a total number of human users in said system and a total number of robotic picking apparatuses in said system is at least 1:10.

8. The system of claim 1, wherein the container is a bulk container comprising a plurality of items of a same type, wherein the different place is a shipping container comprising items based on an order, whereby said plurality of robotic picking apparatuses are configured to fulfill the order, wherein the system further comprises:
- a picking station, wherein said picking station comprises at least one robotic picking apparatus;
- storage for storing containers; and
- a plurality of transportation robots configured to autonomously transport containers from said storage to said picking station.

9. A method performed using the system of claim 1, the method comprising:
- obtaining an instruction to pick an item from a container;
- first determining that an operation plan for the robotic picking apparatus cannot be devised autonomously, whereby determining the item cannot be picked by the robotic picking apparatus in the autonomous mode;
- in response to said first determining, second determining that the operation plan cannot be devised based on additional human provided input, whereby determining the item cannot be picked by the robotic picking apparatus in the human-assisted mode; and
- in response to said second determining, receiving user instructions for remotely controlling the robotic picking apparatus, whereby the robotic picking apparatus is operated in the remote-controlled mode and controlled by the remote human user; and
- moving the robotic picking apparatus based on the user instructions.

10. A system comprising:
- a plurality of robotic picking apparatuses configured to pick an item from a container and place the item in a different place, wherein each robotic picking apparatus is configured to operate in one of at least three operational modes: an autonomous mode, a human-assisted mode, and a remote-controlled mode,
- wherein in the autonomous mode, the robotic picking apparatus is configured to automatically determine an operation plan in order to pick the item from the container and place the item in the different place and execute the operation plan without input from a human,
- wherein in the human-assisted mode, the operation plan is determined using input from a human and the operation plan is executed automatically without additional input from a human,
- wherein in the remote-controlled mode, movements of the robotic picking apparatus are controlled directly by a remote human user;
- wherein said plurality of robotic picking apparatuses are connectable over a network to a remote site, wherein in the remote site, human users are capable of providing input to said plurality of robotic picking apparatuses, wherein the input provided by the human users is transmitted to said plurality of robotic picking apparatuses over the network, wherein the input provided by the human users comprises input for the human-assisted mode and commands for remote controlling the robotic picking apparatus in the remote-controlled mode;

wherein said controller is configured to select between the autonomous mode, the human-assisted mode and the remote-controlled mode based on an estimated cost of operating in the autonomous mode, an estimated cost of operating in the human-assisted mode, and an estimated cost of operating in the remote-controlled mode.

11. A method performed using a system, the system comprising: a plurality of robotic picking apparatuses configured to pick an item from a container and place the item in a different place, wherein each robotic picking apparatus is configured to operate in one of at least three operational modes: an autonomous mode, a human-assisted mode, and a remote-controlled mode, wherein in the autonomous mode, the robotic picking apparatus is configured to automatically determine an operation plan in order to pick the item from the container and place the item in the different place and execute the operation plan without input from a human, wherein in the human-assisted mode, the operation plan is determined using input from a human and the operation plan is executed automatically without additional input from a human, wherein in the remote-controlled mode, movements of the robotic picking apparatus are controlled directly by a remote human user; wherein the plurality of robotic picking apparatuses are connectable over a network to a remote site, wherein in the remote site, human users are capable of providing input to the plurality of robotic picking apparatuses, wherein the input provided by the human user is transmitted to the plurality of robotic picking apparatuses over the network, wherein the input provided by the human users comprises for the human-assisted mode and commands for remote controlling the robotic picking apparatus in the remote-controlled mode; the method comprising:

obtaining an instruction to pick an item from a container;

first determining that an operation plan for the robotic picking apparatus cannot be devised autonomously, whereby determining the item cannot be picked by the robotic picking apparatus in the autonomous mode;

in response to said first determining, second determining that the operation plan cannot be devised based on additional human provided input, whereby determining the item cannot be picked by the robotic picking apparatus in the human-assisted mode;

in response to said second determining, selecting a user out of a plurality of users to control the robotic picking apparatus, wherein said selecting is performed from a plurality of human users located remotely from the robotic picking apparatus;

in response to said second determining, receiving from the user user instructions for remotely controlling the robotic picking apparatus, whereby the robotic picking apparatus is operated in the remote-controlled mode and controlled by the user; and moving the robotic picking apparatus based on the user instructions.

12. The method of claim 11, wherein a ratio between a total number of human users that are tasked with assisting or controlling robotic picking apparatuses and a total number of the robotic picking apparatuses is at least 1:100.

13. A method performed using a system, the system comprising: a plurality of robotic picking apparatuses configured to pick an item from a container and place the item in a different place, wherein each robotic picking apparatus is configured to operate in one of at least three operational modes: an autonomous mode, a human-assisted mode, and a remote-controlled mode, wherein in the autonomous mode, the robotic picking apparatus is configured to automatically determine an operation plan in order to pick the item from the container and place the item in the different place and execute the operation plan without input from a human, wherein in the human-assisted mode, the operation plan is determined using input from a human and the operation plan is executed automatically without additional input from a human, wherein in the remote-controlled mode, movements of the robotic picking apparatus are controlled directly by a remote human user; wherein the plurality of robotic picking apparatuses are connectable over a network to a remote site, wherein in the remote site, human users are capable of providing input to the plurality of robotic picking apparatuses, wherein the input provided by the human users is transmitted to the plurality of robotic picking apparatuses over the network, wherein the input provided by the human users comprises input for the human-assisted mode and commands for remote controlling the robotic picking apparatus in the remote-controlled mode; the method comprising:

obtaining an instruction to pick an item from a container;

first determining that an operation plan for the robotic picking apparatus cannot be devised autonomously, whereby determining the item cannot be picked by the robotic picking apparatus in the autonomous mode, wherein said first determining comprises:

calculating a first confidence measurement of the capability of autonomous determination of the operation plan, and comparing the first confidence measurement with a first threshold;

in response to said first determining, second determining that the operation plan cannot be devised based on additional human provided input, whereby determining the item cannot be picked by the robotic picking apparatus in the human-assisted mode, wherein said second determining comprises:

calculating a second confidence measurement of the capability of determination of the operation plan using additional human provided input, and comparing the second confidence measurement with a second threshold;

in response to said second determining, receiving user instructions for remotely controlling the robotic picking apparatus, whereby the robotic picking apparatus is operated in the remote-controlled mode and controlled by the remote human user; and moving the robotic picking apparatus based on the user instructions.

14. The method of claim 13, wherein at least one of the first threshold and the second threshold is modified based on availability of human users to provide input.

15. The method of claim 13, wherein the first threshold is modified based on availability of manned stations for remote assistance; and wherein the second threshold is modified based on availability of manned stations for remote control.

16. A method performed using a system, the system comprising: a plurality of robotic picking apparatuses configured to pick an item from a container and place the item in a different place, wherein each robotic picking apparatus is configured to operate in one of at least three operational modes: an autonomous mode, a human-assisted mode, and a remote-controlled mode, wherein in the autonomous mode, the robotic picking apparatus is configured to automatically determine an operation plan in order to pick the item from the container and place the item in the different place and execute the operation plan without input from a human, wherein in the human-assisted mode, the operation plan is determined using input from a human and the operation plan is executed automatically without additional input from a human, wherein in the remote-controlled mode, movements of the robotic picking apparatus are controlled directly by a remote human user; wherein the plurality of robotic picking apparatuses are connectable over a network to a remote site, wherein in the remote site, human users are capable of providing input to the plurality of robotic picking apparatuses, wherein the input provided by the human users is transmitted to the plurality of robotic picking apparatuses over the network, wherein the input provided by the human users comprises input for the human-assisted mode and commands for remote controlling the robotic picking apparatus in the remote-controlled mode; the method comprising:

obtaining an instruction to pick an item from a container;
first determining that an operation plan for the robotic picking apparatus cannot be devised autonomously, whereby determining the item cannot be picked by the robotic picking apparatus in the autonomous mode;
in response to said first determining, second determining that the operation plan cannot be devised based on additional human provided input, whereby determining the item cannot be picked by the robotic picking apparatus in the human-assisted mode;
in response to said second determining, receiving user instructions for remotely controlling the robotic picking apparatus, whereby the robotic picking apparatus is operated in the remote-controlled mode and controlled by the remote human user; and
moving the robotic picking apparatus based on the user instructions;
wherein the method further comprising obtaining an order to fulfill; and fulfilling the order by instructing the robotic picking apparatus to place items in a shipping container in accordance with the order, wherein said fulfilling comprises:
the robotic picking apparatus picking and placing at least one item in the shipping container in an autonomous mode and without user input; and
the robotic picking apparatus picking and placing at least one item in a human-assisted mode.

17. A method performed using a system, the system comprising: a plurality of robotic picking apparatuses configured to pick an item from a container and place the item in a different place, wherein each robotic picking apparatus is configured to operate in one of at least three operational modes: an autonomous mode, a human-assisted mode, and a remote-controlled mode, wherein in the autonomous mode, the robotic picking apparatus is configured to automatically determine an operation plan in order to pick the item from the container and place the item in the different place and execute the operation plan without input from a human, wherein in the human-assisted mode, the operation plan is determined using input from a human and the operation plan is executed automatically without additional input from a human, wherein in the remote-controlled mode, movements of the robotic picking apparatus are controlled directly by a remote human user; wherein the plurality of robotic picking apparatuses are connectable over a network to a remote site, wherein in the remote site, human users are capable of providing input to the plurality of robotic picking apparatuses, wherein the input provided by the human users is transmitted to the plurality of robotic picking apparatuses over the network, wherein the input provided by the human users comprises input for the human-assisted mode and commands for remote controlling the robotic picking apparatus in the remote-controlled mode; the method comprising:

obtaining an instruction to pick an item from a container;
first determining that an operation plan for the robotic picking apparatus cannot be devised autonomously, whereby determining the item cannot be picked by the robotic picking apparatus in the autonomous mode;
in response to said first determining, second determining that the operation plan cannot be devised based on additional human provided input, whereby determining the item cannot be picked by the robotic picking apparatus in the human-assisted mode;
in response to said second determining, receiving user instructions for remotely controlling the robotic picking apparatus, whereby the robotic picking apparatus is operated in the remote-controlled mode and controlled by the remote human user; and
moving the robotic picking apparatus based on the user instructions;
wherein the method further comprising obtaining an order to fulfill; and
fulfilling the order by instructing the robotic picking apparatus to place items in a shipping container in accordance with the order, wherein said fulfilling comprises:
the robotic picking apparatus picking and placing at least one item in the shipping container in a remote-controlled mode; and
the robotic picking apparatus picking and placing at least one item in the shipping container in an autonomous mode and without user input.

18. A method performed using a system, the system comprising: a plurality of robotic picking apparatuses configured to pick an item from a container and place the item in a different place, wherein each robotic picking apparatus is configured to operate in one of at least three operational modes: an autonomous mode, a human-assisted mode, and a remote-controlled mode, wherein in the autonomous mode, the robotic picking apparatus is configured to automatically determine an operation plan in order to pick the item from the container and place the item in the different place and execute the operation plan without input from a human, wherein in the human-assisted mode, the operation plan is determined using input from a human and the operation plan is executed automatically without additional input from a human, wherein in the remote-controlled mode, movements of the robotic picking apparatus are controlled directly by a remote human user; wherein the plurality of robotic picking apparatuses are connectable over a network to a remote site, wherein in the remote site, human users are capable of providing input to the plurality of robotic picking apparatuses, wherein the input provided by the human users is transmitted to the plurality of robotic picking apparatuses over the network, wherein the input provided by the human users comprises input for the human-assisted mode and commands for remote controlling the robotic picking apparatus in the remote-controlled mode; the method comprising:

obtaining an instruction to pick an item from a container;
computing an estimated cost of operating the robotic picking apparatus in the autonomous mode, wherein the estimated cost of operating the robotic picking apparatus in the autonomous mode is based on a probability of success of operating the robotic picking apparatus in the autonomous mode and estimated cost of damage to the item;
computing an estimated cost of operating the robotic picking apparatus in the human-assisted mode, wherein the estimated cost of operating the robotic picking apparatus in the human-assisted mode is based on a probability of success of operating the robotic picking apparatus in the human-assisted mode, the estimated cost of damage to the item and a cost of labor in human-assisted model; computing an estimated cost of operating the robotic picking apparatus in the remote-controlled mode, wherein the estimated cost of operating the robotic picking apparatus in the remote-controlled mode is based on a probability of success of operating the robotic picking apparatus in the remote-controlled mode, the estimated cost of damage to the item and a cost of labor in remote-controlled mode;

selecting between the autonomous mode, the human-assisted mode and the remote-controlled mode based on the estimated costs; and operating the robotic picking apparatus to pick up the item from the container in the selected mode.

* * * * *